(12) United States Patent  (10) Patent No.: US 9,098,942 B2
Yoshimoto et al.  (45) Date of Patent: Aug. 4, 2015

(54) LEGEND INDICATOR FOR SELECTING AN ACTIVE GRAPH SERIES

(75) Inventors: Brandon Yoshimoto, Los Angeles, CA (US); Hugh Zhang, Winchester, MA (US); Melinda Yian Tang, Cambridge, MA (US); Prashant Singh, Burlington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 454 days.

(21) Appl. No.: 13/439,636

(22) Filed: Apr. 4, 2012

(65) Prior Publication Data

US 2013/0187923 A1   Jul. 25, 2013

Related U.S. Application Data

(60) Provisional application No. 61/590,698, filed on Jan. 25, 2012.

(51) Int. Cl.
*G09G 5/00* (2006.01)
*G06T 11/20* (2006.01)

(52) U.S. Cl.
CPC .................. *G06T 11/206* (2013.01)

(58) Field of Classification Search
CPC .................. G06T 11/206; G06F 3/0481
USPC .................. 345/440
See application file for complete search history.

(56) References Cited

U.S. PATENT DOCUMENTS

| 5,917,499 | A | 6/1999 | Jancke et al. | |
| 7,512,875 | B2 | 3/2009 | Davis | |
| 2012/0198351 | A1* | 8/2012 | Lee et al. | 715/744 |
| 2013/0009963 | A1* | 1/2013 | Albrecht | 345/473 |

OTHER PUBLICATIONS

Highcharts JS software package: http://www.highcharts.com/products/highcharts with version on Jan. 20, 2012.*
Jon Peltier, Using worksheet controls to highlight selected data in an excel chart, http://peltiertech.com/WordPress/interactive-controls-to-highlight-selected-data-in-an-excel-chart/, Jan. 11, 2012.*
Javascript, "Display tooltip for invisible series in Highcharts—Stack Overflow," retrieved from http://stackoverflow.com/questions/7557533/display-tooltip-for-invisible-series-in-highcharts and http://jsfiddle.net/fDNh9/1/ on Jan. 3, 2012, 3 pages.

(Continued)

*Primary Examiner* — Devona Faulk
*Assistant Examiner* — Jin Ge
(74) *Attorney, Agent, or Firm* — Kilpatrick Townsend & Stockton LLP

(57) ABSTRACT

Various arrangements for identifying and selected a data value of a dataset presented on a graph are described. The graph may be presented, wherein the graph illustrates a plurality of datasets and a legend that identifies each of the plurality of datasets. A selection of the dataset may be received via the legend of the graph. An input of a point on the graph may be received. A value of a data point from the dataset that corresponds to the input of the point on the graph may be presented.

15 Claims, 9 Drawing Sheets

(56) References Cited

OTHER PUBLICATIONS

Jgardner, "Interacting with Charts—CloudLink," Knowledge Base, retrieved from http://cloudlink.soasta.com/t5/Knowledge-Base/Interacting-with-Charts/ba-p/136 on Jan. 3, 2012, Jul. 6, 2011, 6 pages.

jsfiddle.net Alpha, "Element Stacks," retrieved from http://jsfiddle.net/phhm9/ on Jan. 4, 2012, 1 page.

jsfiddle.net Alpha, "Multiline—Highlight Series," retrieved from http://jsfiddle.net/jlbriggs/57SR9/ on Jan. 4, 2012, 1 page.

Lees Corner, "Showing and Hiding Series in chart," retrieved from http://leeontech.wordpress.com/2009/03/13/showing-and-hiding-series-in-chart/ on Jan. 3, 2012, Mar. 13, 2009, 12 pages.

Syncfusion, "4.9.4 Interactive Features," retrieved from http://help.synefusion.com/ug_93/User%20Interface/Windows%20Forms/Chart/defauit.htm?turl=Documents%2Finteractivefeatures1.htm on Jan. 3, 2012, 4 pages.

* cited by examiner

LEGEND INDICATOR FOR SELECTING AN ACTIVE GRAPH SERIES

CROSS REFERENCES TO RELATED APPLICATIONS

This application claims priority to co-pending, provisional application No. 61/590,698, filed Jan. 25, 2012, entitled "Legend Indicator for Selecting an Active Graph Series Targeted by a Line Data Cursor," the entire disclosure of which is hereby incorporated by reference for all purposes.

BACKGROUND

Some mobile devices, such as cellular phones, tend to be small and use touch screen-based user interfaces. If a user is viewing a graph containing one or more datasets, it may be difficult to select a particular dataset and/or data point of the dataset based on the user's input, such as the user touching the screen. As such, it may be frustrating for a user attempting to interact with a graph containing multiple datasets.

SUMMARY

Various arrangements for interacting with graphs are presented. A method for identifying a data value of a dataset presented on a graph may be presented. The method may include presenting, by a computerized device, the graph, wherein the graph illustrates a plurality of datasets and a legend that identifies each of the plurality of datasets. The method may include receiving, by the computerized device, a selection of the dataset via the legend of the graph, wherein the dataset is part of the plurality of dataset. The method may include emphasizing, by the computerized device, a graphical representation of the dataset indicated by the selection made via the legend of the graph. The method may include receiving, by the computerized device, an input of a point on the graph. The method may include presenting, by the computerized device, a value of a data point. The data point may be from the dataset indicated by the selection. The data point may correspond to the input of the point on the graph.

Embodiments of such a method may include one or more of the following: The method may further include selecting, by the computerized device, the data point based on an x-axis coordinate of the point on the graph. The data point may have a closest x-axis value of the dataset to the x-axis coordinate of the point on the graph. The data point may be interpolated based on the dataset and the x-axis coordinate of the point on the graph. A line may be displayed on the graph that passes through the point on the graph and is parallel to a y-axis of the graph. An indication of the point on the graph may be presented. Values of other data points of the dataset indicated by the selection and values of other data points of other datasets of the plurality of datasets may not be presented while the value of the data point from the dataset that corresponds to the input of the point on the graph is presented. The graph may be presented using a touch screen interface of a mobile device. The selection of the dataset may be received via the touch screen interface of the mobile device. The mobile device may be the computerized device.

Embodiments of such a method may additionally or alternatively include one or more of the following: The method may include receiving, by the computerized device, a swipe gesture on the touch screen interface of the mobile device. The method may include presenting, by the computerized device, based at least in part on the swipe gesture, a second value of a second data point of the dataset. Emphasizing the graphical representation of the dataset may include hiding each other dataset of the plurality of datasets. Emphasizing the graphical representation of the dataset may comprise emphasizing an indication of the dataset in the legend of the graph. The value of the data point may be presented in a tooltip. The method may include, after presenting the value of the data point, receiving, by the computerized device, a second selection of a second dataset via the legend of the graph, wherein the second dataset is part of the plurality of datasets. The method may include presenting, by the computerized device, a second value of a second data point from the second dataset that corresponds to the point on the graph.

In some embodiments, a computer program product residing on a non-transitory processor-readable medium for identifying a data value of a dataset presented on a graph is presented. The computer program product may comprise processor-readable instructions configured to cause a processor to cause the graph to be presented, wherein the graph illustrates a plurality of datasets and a legend that identifies each of the plurality of datasets. The computer program product may comprise processor-readable instructions configured to cause a processor to receive a selection of the dataset via the legend of the graph, wherein the dataset is part of the plurality of datasets. The computer program product may comprise processor-readable instructions configured to cause a processor to emphasize a graphical representation of the dataset indicated by the selection made via the legend of the graph. The computer program product may comprise processor-readable instructions configured to cause a processor to receive an input of a point on the graph. The computer program product may comprise processor-readable instructions configured to cause a processor to cause a value of a data point to be presented. The data point may be from the dataset indicated by the selection. The data point may correspond to the input of the point on the graph.

Embodiments of such a computer program may include one or more of the following: The processor-readable instructions may further comprise processor-readable instructions configured to cause the processor to select the data point based on an x-axis coordinate of the point on the graph. The data point may have a closest x-axis value of the dataset to the x-axis coordinate of the point on the graph. The data point may be interpolated based on the dataset and the x-axis coordinate of the point on the graph. The processor-readable instructions may further comprise processor-readable instructions configured to cause the processor to cause a line to be presented on the graph that passes through the point on the graph and is parallel to a y-axis of the graph. The processor-readable instructions may further comprise processor-readable instructions configured to cause the processor to cause an indication of the point on the graph to be presented.

In some embodiments, a system for identifying a data value of a dataset presented on a graph is presented. The system may include a processor. The system may also include a memory communicatively coupled with and readable by the processor and having stored therein processor-readable instructions. When executed by the processor, the processor-readable instructions may cause the processor to cause the graph to be presented. The graph may illustrate a plurality of datasets and a legend that identifies each of the plurality of datasets. The processor-readable instructions may cause the processor to receive a selection of the dataset via the legend of the graph, wherein the dataset is part of the plurality of datasets.

The processor-readable instructions may cause the processor to emphasize a graphical representation of the dataset indicated by the selection made via the legend of the graph.

The processor-readable instructions may cause the processor to emphasizing the graphical representation of the dataset comprises hiding each other dataset of the plurality of datasets. The processor-readable instructions may cause the processor to emphasizing the graphical representation of the dataset comprises emphasizing an indication of the dataset in the legend of the graph. The processor-readable instructions may cause the processor to receive an input of a point on the graph. The processor-readable instructions may cause the processor to cause a value of a data point to be presented. The data point may be from the dataset indicated by the selection. The data point may correspond to the input of the point on the graph.

BRIEF DESCRIPTION OF DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In order to simplify selection and presentation (e.g., display) of one or more values associated with a data point of a dataset graphically represented on a graph that contains graphical representations of multiple datasets, a user may use a legend of the graph to select a particular dataset. The user may then select a point on the graph. Selections made on the graph may occur via a touch screen interface. The user may touch the display of the legend to select a dataset and may touch the graph to select a point aligned with a data point the user desires to interrogate. Based on where the user touches the graph and the selected dataset, one or more values of a data point of the selected dataset may be presented. The value of the data point may be presented in the form of a tooltip.

To select a particular data point of the dataset, a line that is parallel to the y-axis may be drawn through the point of the graph selected by the user. Where this line intersects the selected dataset, may indicate the data point that is selected. Put another way, the x-value of the point received via user input may be used to determine the data point for presentation (e.g., the data point has the same or closest x-axis coordinate of data points in the dataset to the point). Values are presented to the user for this data point. At the time the one or more values of the data point are presented, values of no other data points (of the same dataset or a different dataset) may be presented.

After one or more values of a data point are presented, the user may select a different dataset via the legend. One or more values of a data point of the newly selected dataset may then be displayed. This data point may be selected using the line drawn through the point of the graph selected by the user.

In some embodiments, a swipe to a touchscreen of the computerized device presenting the graph may be used to select a different data point and/or a different dataset. For instance, a swipe to the left may select a data point of the same dataset to the left of the currently selected data point. A swipe to the right may select a data point of the same dataset to the right of the currently selected data point. A swipe up may select a data point of the dataset that is above the currently selected dataset along the line. A swipe down may select a data point of the dataset that is below the currently selected dataset along the line. The line that passes through the point input by the user that is parallel to the y-axis may or may not be displayed. Similarly, an indication of the point input by the user may or may not be displayed. While the line is discussed as parallel to the y-axis, it should be understood that the line may be parallel to other axes, such as the x-axis instead. Which axis the line is parallel to may vary depending on the type of graph.

Figure 1:
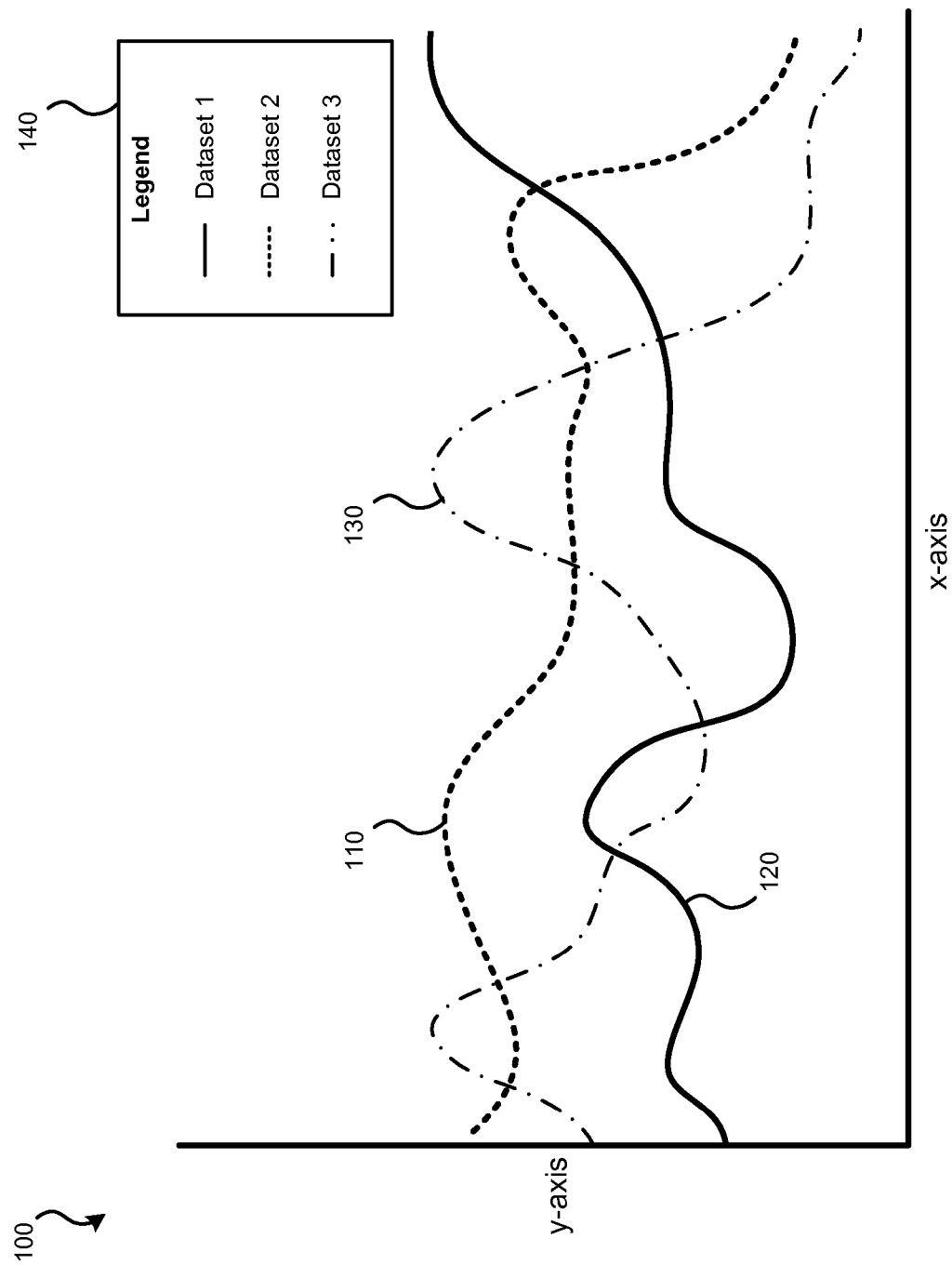
FIG. 1 illustrates an embodiment of a graphical user interface presenting a graph that contains multiple datasets.

FIG. 1 illustrates an embodiment 100 of a graphical user interface presenting a graph that graphically presents multiple datasets. The graph of embodiment 100 contains graphical representations of three datasets, graphical representation of dataset 110, graphical representation of dataset 120, and graphical representation of dataset 130. It should be understood that in other embodiments a fewer or a greater number of datasets may be presented. Datasets appearing on the graph of FIG. 1 may be represented by lines. In other embodiments, other graphical representations may be used, such as bars, points, etc. Each dataset may contain multiple data points. The graph of FIG. 1 is two-dimensional; it has an x-axis and a y-axis. Other embodiments of graphs may have some other number of dimensions. The graph of FIG. 1 may be displayed to a user via a touch screen. As such, to provide input to the graph of FIG. 1, a user may touch the graph.

A mobile device, such as a cellular phone or tablet computer, may be used to present the graph of FIG. 1. Some mobile devices, such as cellular telephones, tend to have small touch screens in comparison to the size of a user's hand. In a typical arrangement, it may be difficult for a user to accurately select via touch a dataset graphically presented on the graph, especially if multiple datasets are graphically presented near each other. The graph of FIG. 1 may also contain legend 140. Each entry in legend 140 may correspond to a dataset presented by the graph. As such, in legend 140, "Dataset 1" corresponds to graphical representation of dataset 120; "Dataset 2" corresponds to graphical representation of dataset 110; and "Dataset 3" corresponds to graphical representation of dataset 130. The graphical representations of each dataset may be drawn as a line that passes through each data point of the dataset. As such, portions of each graphical representation may be interpolated. In other embodiments, only actual data points from each dataset are graphically illustrated (such as by points on the graph).

Figure 2:
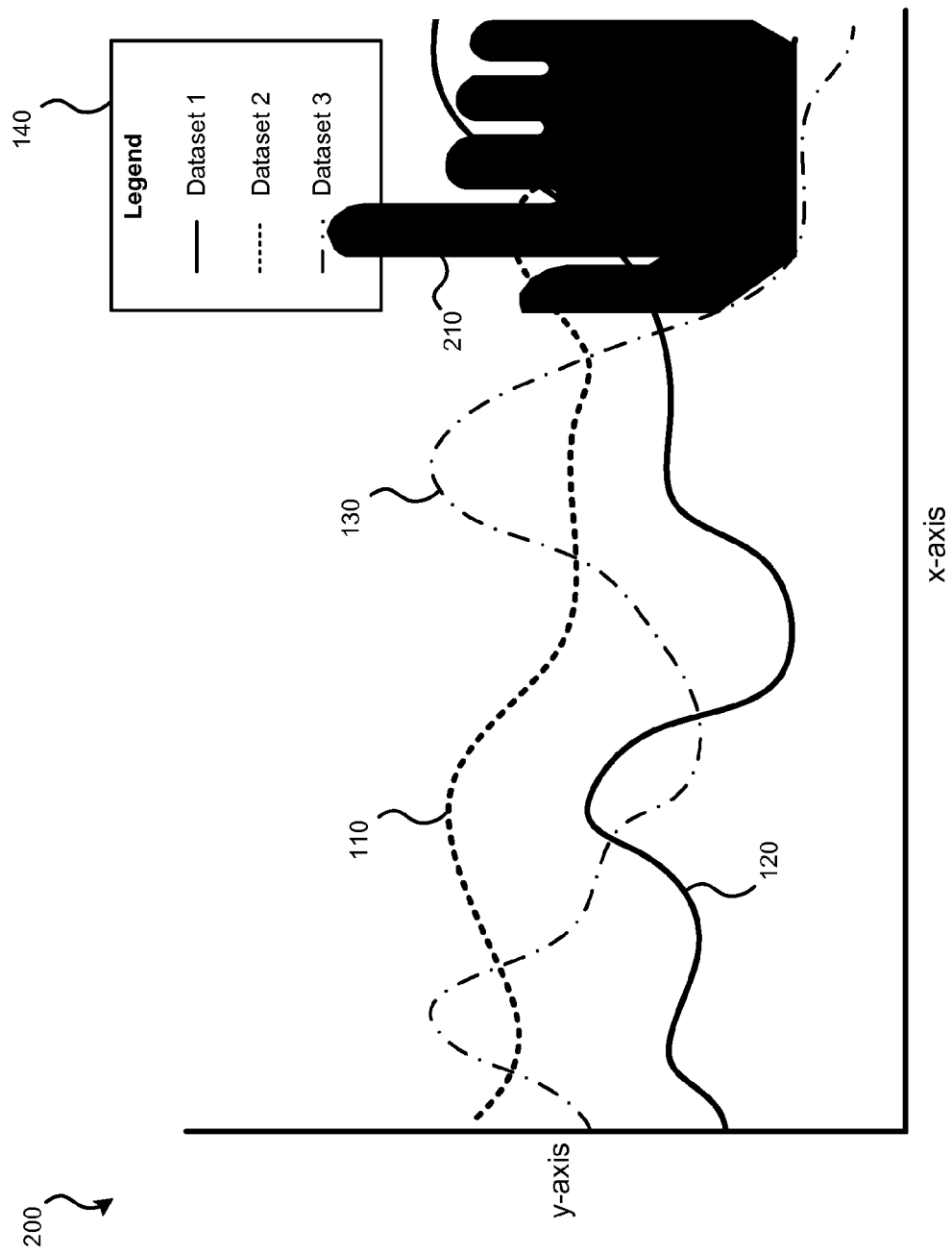
FIG. 2 illustrates an embodiment of a graphical user interface presenting a graph receiving input on the graph's legend via a touchscreen interface.

FIG. 2 illustrates an embodiment 200 of a graphical user interface presenting a graph receiving input on the graph's legend via a touchscreen interface. Embodiment 200 may represent embodiment 100 of FIG. 1 with a user providing touch input. In embodiment 200, a user's hand 210 (e.g., fingertip) is touching a point on the graph of FIG. 2. The user's hand 210 is selecting a particular dataset (in this case, "Dataset 3") via legend 140. In other embodiments, a dataset may be selected using some other form of input provided by the user. For example, a keystroke may be used to select a particular dataset. In some embodiments, a gesture, such as a swipe, may be used to select a particular dataset. In such embodiments, if "Dataset 2" is selected, a swipe up may result in selection of "Dataset 1," and the swipe down may result in "Dataset 3" being selected.

The dataset selected by the user's hand 210 is used to determine which dataset should be active. The selected dataset may be emphasized. Emphasizing the selected dataset may include bolding or otherwise highlighting the graphical representation of the selected dataset and/or the selected dataset's legend entry. Emphasizing the selected dataset may also include deemphasizing other datasets, such as by fading or hiding graphical representations of other datasets. If hidden or faded, such other datasets may remain indicated in legend 140. While embodiments detailed herein may function in conjunction with a touchscreen device, it should be understood that similar principles may be applied to computerized devices that use other input methods, such as a cursor controlled by a trackball or mouse. Other input device are also possible.

Figure 3:
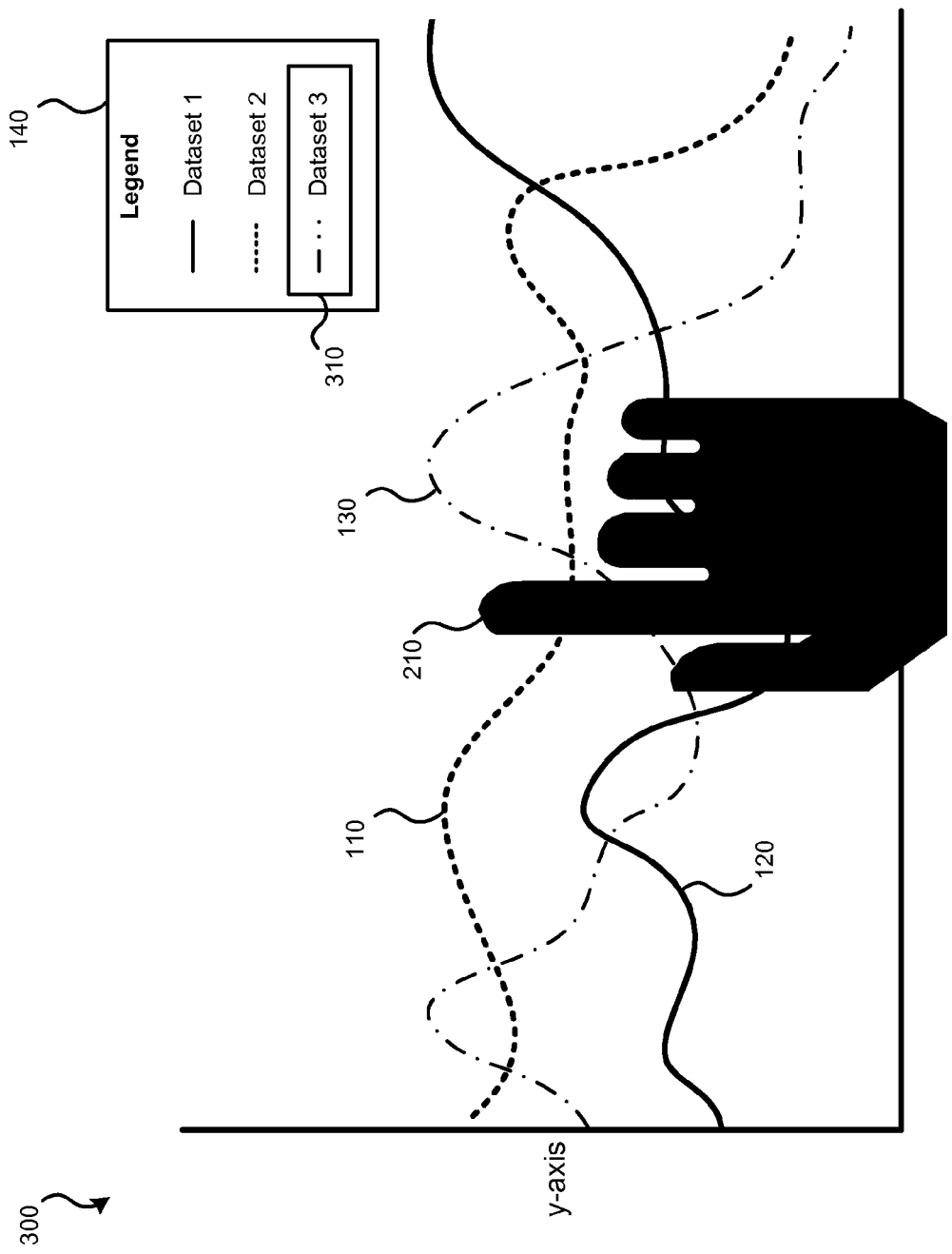
FIG. 3 illustrates an embodiment of a graphical user interface presenting a graph receiving input of a point on the graph via a touchscreen interface.

Following user's hand 210 touching the indication of "Dataset 3" in legend 140, "Dataset 3" and its corresponding graphical representation of dataset 130 is selected. FIG. 3 illustrates an embodiment of a graphical user interface presenting a graph receiving input of a point on the graph via a touchscreen interface. The graph of FIG. 3 may represent the graphs of FIGS. 1 and 2 after a user has selected "Dataset 3" via touch input. User's hand 210 may then touch a point on the graph. By indicating a point on the graph of FIG. 3, the user may select the approximate value along the x-axis that the user is interested in for the selected dataset. Graphical indicator 310 indicates the dataset ("Dataset 3") selected by the user. In some embodiments, rather than touching and releasing the touch screen where the user desires to input a point; the user may drag a fingertip along the touchscreen to the point desired. As being dragged, a line or other graphical representation may follow the touch input of the user. Such a graphical representation may allow the user to precisely select a data point of the selected dataset by showing a graphical indicator (e.g., the line) that intersects with the graphical representation of the dataset 130.

In other embodiments, the user may select the appropriate value along the y-axis that the user is interested in for the dataset previously selected. In some embodiments, the user may be permitted to select whether the x-coordinate (also referred to as a line that passes through the point input by the user and is parallel to the y-axis) or the y-coordinate (also referred to as a line that passes through the point input by the user and is parallel to the x-axis) or some other coordinate of the user's input point is used. In some embodiments, the coordinate that is used from the input point may be selected based on characteristics of the graph being presented.

Figure 4:
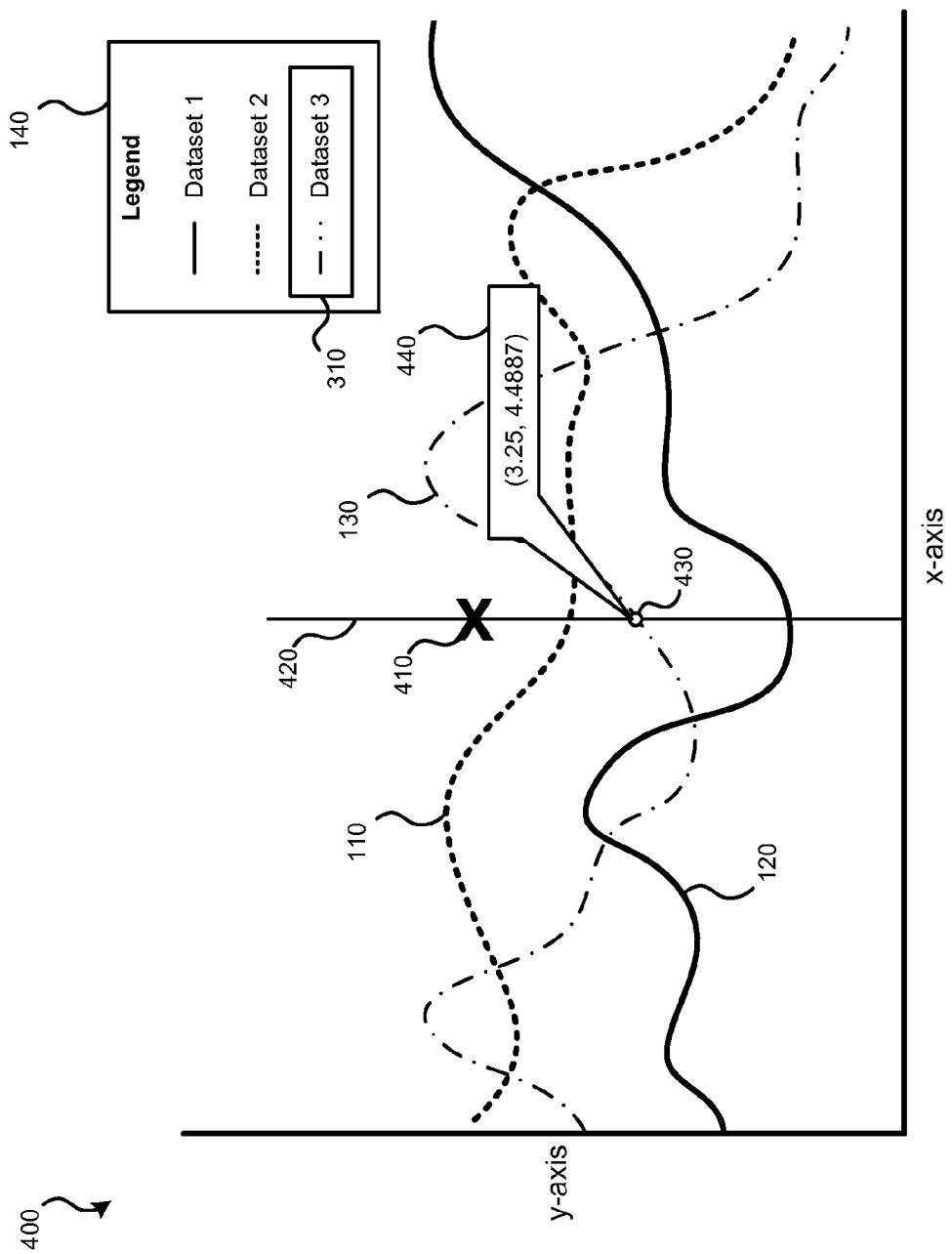
FIG. 4 illustrates an embodiment of a graphical user interface presenting a graph presenting values of a data point of a selected dataset.

FIG. 4 illustrates an embodiment 400 of a graphical user interface presenting a graph presenting values of a data point of a selected dataset. Embodiment 400 may represent the graphs of FIGS. 1-3, following user selection of a dataset and a point on the graph (as shown in FIGS. 2 and 3, respectively). Position 410 indicates the point on graph 400 touched by user's hand 210. A graphical indication, such as the "x" illustrated in FIG. 4, may or may not be displayed to indicate where the user input was determined to be located. Line 420 may be a line parallel to the y-axis that passes through position 410 (which represents the point received as user input). Line 420 may or may not be displayed. Whether line 420 is displayed may be configurable by the user and/or a system administrator. Data point 430 is selected based on the selected dataset (indicated by graphical indicator 310) and position 410. Data point 430 is of the selected dataset and is at the intersection of line 420 and the graphical representation of dataset 130. Put another way, the x-coordinate of the input point received from the user and the selected dataset is used to select data point 430. As such, data point 430 may have the same x-coordinate as the input point received from the user. Accordingly, if the user touched anywhere along where line 420 is displayed, values of the same data point, data point 430, may be selected for presentation.

If a data point of the dataset corresponds to the line or x-coordinate, values of that data point may be presented. In some instances, the selected dataset may not have a data point that exactly corresponds to the x-coordinate of the input point (or the point where the line parallel to the y-axis that passes through the input point intersects the graphical representation of the selected dataset). Therefore, one or more values of data point 430 may be interpolated or extrapolated based on other data points of the selected dataset. In some embodiments, rather than extrapolating or interpolating one or more value of the data point, the closest data point of the selected dataset may be selected instead (as described in relation to FIG. 5).

As illustrated in the graph of FIG. 4, a tool tip that indicates one or more values of the selected data point (data point 430) may be presented. In the illustrated embodiment, an x-coordinate and a y-coordinate of data point 430 is presented via tooltip 440. Tooltip 440 may remain displayed until some other user input is received. Other ways of presenting the one or more values of data point 430 may be used in other embodiments, such as by presenting the values outside the display region of the graph. Data point 430 may be selected based on the selected dataset indicated by graphical indicator 310 and position 410, which is where the user touched the graph. As such, where line 420, which is parallel to the y-axis, intersects the selected dataset may determine which data point's (data point 430) values are presented. The values of only one data point of the selected dataset and/or any other dataset may be presented on the display at a single time. Such an arrangement may simplify display of the graph of FIG. 4, especially on a small, touch screen-based device, such as a smartphone. If selection of a different data point is desired, a user may perform a gesture, such as swiping to the left or right, to select a data point to the left or right, respectively, of the selected dataset. If a user desires a value of a data point along line 420 of a different dataset, the user may select a different dataset using legend 140 (or some other arrangement for selecting a dataset), or perform a gesture such as a swipe up or down.

Figure 5:
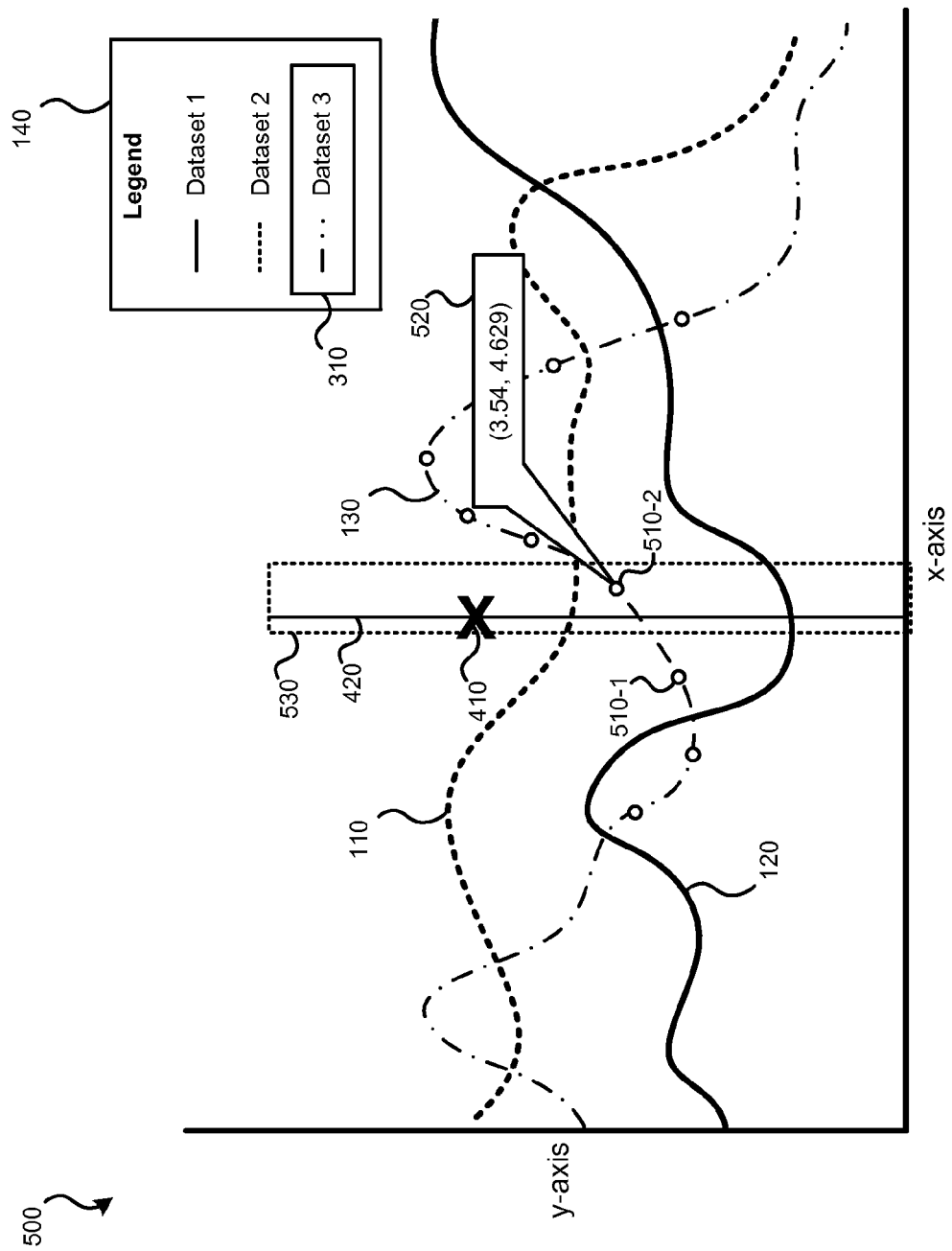
FIG. 5 illustrates another embodiment of a graphical user interface presenting a graph presenting values of a data point of a selected dataset.

FIG. 5 illustrates another embodiment 500 of a graphical user interface presenting a graph presenting values of a data point of a selected dataset. Similar to embodiment 400, of FIG. 4, embodiment 500 may represent the graphs of FIGS. 1-3, following user selection of a dataset and a point on the graph (as shown in FIGS. 2 and 3, respectively). In embodiment 500, a data point of the selected dataset does not correspond precisely to position 410. Rather than interpolating or extrapolating one or more values of a data point that would have the same x-coordinate as position 410, the closest data point of the selected dataset is presented.

In embodiment 500, some of the data points of the selected dataset ("Dataset 3" as indicated by graphical indicator 310) are illustrated. Only two of such data points 510 are labeled for simplicity. Data point 510-2 of the selected dataset has its values presented via tooltip 520. Data point 510-2 may have been selected instead of data point 510-1 because the x-coordinate value of data point 510-2 was closer to the x-coordinate value of position 410. Similarly, data point 510-2 may have been selected because it is closer to line 420 than data point 510-1. In some embodiments, rather than using the closest data point, the data point with the closest x-coordinate that is smaller or larger than the x-coordinate of position 410 may be used. Similarly, rather than using the closest data point, the data point closest to the left of line 420 or closest to the right of line 420 may be used. As such, in embodiment 500, values of a data point are not extrapolated or interpolated.

Region 530, represented by an imaginary dotted line, may represent the region on the graph of embodiment 500 where if a user touched, data point 510-2 would be selected. Because "Dataset 3" is selected and embodiment 500 requires an actual data point of the Dataset 3 to be selected, a user touching anywhere in region 530 on the graph may result in the selection of data point 510-2. Region 530 may be defined based on x-coordinates. The x-coordinate of any point within region 530 may be closest to the x-coordinate value of data point 510-2. Similar regions may be present for other data points of Dataset 3 and the other data sets (when selected). As such, a significantly sized region may be used to select a particular data point.

The values of only one data point of the selected dataset and/or any other dataset may be presented on the display at a single time. Such an arrangement may simplify display of the graph of FIG. 5, especially on a small, touch screen-based device, such as a smartphone. If selection of a different data point is desired, a user may perform a gesture, such as swiping to the left or right, to select a data point to the left or right, respectively, of the selected dataset. For example, a swipe to the left while a tooltip for data point 510-2 is presented may result in data point 510-1 being selected and an associated tooltip (or some other presentation of one or more values of data point 510-1) being displayed. If a user desires a value of a data point closest to line 420 of a different dataset, the user may select a different dataset using legend 140 (or some other arrangement for selecting a dataset), or perform a gesture such as a swipe up or down.

Figure 6:
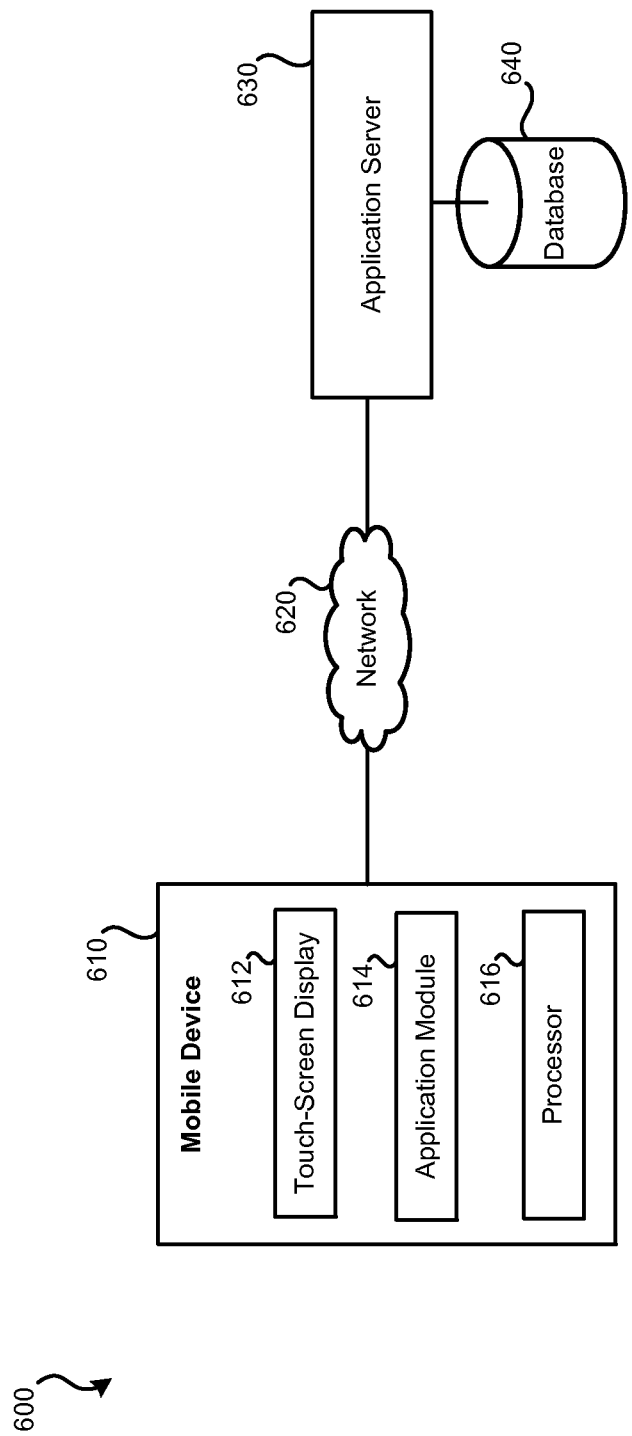
FIG. 6 illustrates an embodiment of a system configured for selecting and identifying a data point of a dataset presented on a graph.

FIG. 6 illustrates an embodiment of a system 600 configured for selecting and identifying a data point of a dataset presented on a graph. System 600 may be used to create, display, and/or receive user input related to the graphs of FIGS. 1-5. System 600 may include: mobile device 610, network 620, application server 630, and database 640. More or fewer components may be present in other embodiments of system 600.

Mobile device 610 may represent a cellular phone (e.g., a smart phone), tablet computer, laptop, or some other form of computerized device. Mobile device 610 may include a touchscreen display 612. Touchscreen display 612 may be used to display graphs, such as the graphs of FIGS. 1-6 and to receive user input in the form of touch input and/or touch-based gestures. Application module 614 may include one or more non-transitory computer-readable mediums and may store one or more applications configured to contain instructions that cause the mobile device to present graphs and receive user input related to the graphs. Application module 614 may contain a locally stored application. Application module 614 may require interaction with application server 630 to function.

Processor 616 may be a general-purpose or a specialized processor that enables presentation of graphs and user input to be received on such graphs. Datasets that are used to create the graphs may be stored locally or remotely from mobile device 610.

Mobile device 610 may communicate using network 620. Network 620 may represent one or more public and/or private networks. Network 620 may include a wireless, cellular network, the Internet, and/or a corporate intranet.

Application server 630 may exchange data with mobile device 610 via network 620 to enable display of graphs and values of data points. Application server 630 may at least partially process data to create the graphs displayed by mobile device 610. The datasets used to create the graphs may be stored by mobile device 610 or may be stored by or accessible to application server 630. For example, database 640 may store datasets that are available for graphing. Database 640 may be local or remote to application server 630. As such, a user, via mobile device 610, may request a graph of specific datasets. These datasets may be retrieved from database 640. Application server 630 and/or mobile device 610 may then process the datasets such that the user is presented with a graph on mobile device 610. Interaction with the graphs may then occur as described in FIGS. 1-6.

While system 600 is presented as using a mobile device to present the graphs to a user for interaction, it should be understood that in other embodiments, other forms of computerized devices may be used, such as a computer system, laptop computer, etc.

Figure 7:
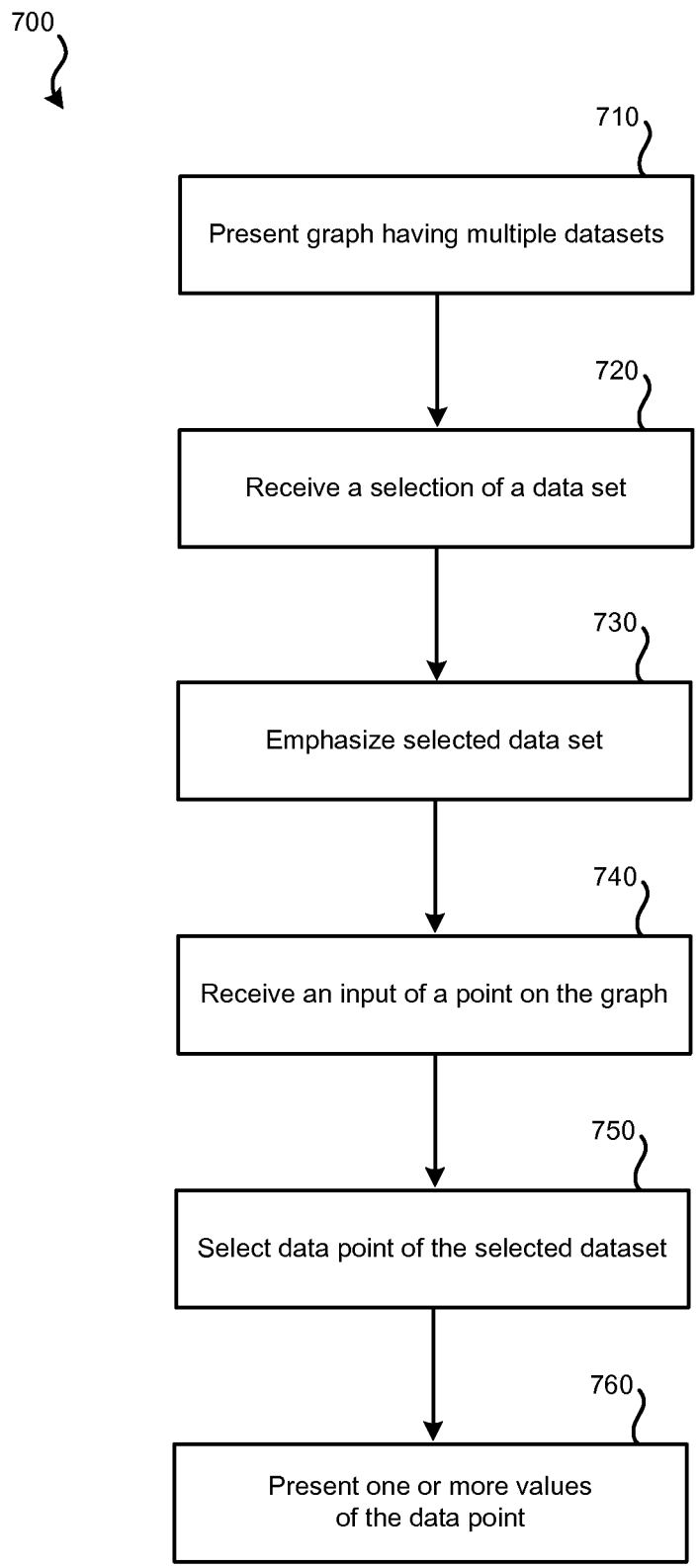
FIG. 7 illustrates an embodiment of a method for selecting and identifying a data point of a dataset presented on a graph.

FIG. 7 illustrates an embodiment of a method 700 for selecting and identifying a data point of a dataset presented on a graph. Method 700 may be performed using a system, such as system 600 of FIG. 6. One or more other computerized devices may also be used to perform method 700. A mobile device, such as a cellular phone, which may have a touch screen interface, may also be used to perform method 700. Method 700 may involve a mobile device communicating with a remote server via one or more networks, such as the Internet. Means for performing each step of method 700 include a mobile computerized device (e.g., a cellular phone, tablet computer), a computer system, and/or some other type of computerized device.

At step 710, a graph may be presented that displays graphical representations of multiple datasets, each of which contains multiple data points. Each dataset may be represented by a line or some other form of graphical representation, such as bars. The graph may be presented using a touch screen device, such that a user can touch various points on the graph. A legend for the graph may be present that indicates each dataset presented on the graph. The user may also be permitted to provide touch input in respect to the legend of the graph.

To present the graph, information may be locally retrieved by the device performing step 710. In some embodiments, data, such as datasets, may be retrieved from a remote computer system via a network. Referring to FIG. 6, mobile device 610 may retrieve data from application server (which accesses database 640) via network 620 (which may include a cellular network). In some embodiments, application server 630 may perform some or all of the processing necessary to create the graph presented at step 710. In such embodiments, an image of the graph may be transmitted to mobile device 610 via network 620.

At step 720, a selection of a dataset may be received. This may occur via a touch interface by a user selecting a dataset via the legend of the graph. An example of this is illustrated in embodiment 200 of FIG. 2. In other embodiments, selection of the dataset may occur via some other form of user input, such as a keystroke or gesture.

At step 730, the selected dataset may be emphasized. Emphasizing the selected dataset may include bolding or otherwise highlighting the graphical representation of the dataset (e.g., the line fit to the data points of the dataset) presented on the graph. Emphasizing the selected dataset may alternatively or additionally include emphasizing the indication of the dataset appearing in the legend of the graph, such as by outlining it (as illustrated in FIG. 2) or deemphasizing other entries within the legend.

Emphasizing the selected dataset may include deemphasizing graphical representations of other datasets, such as by fading them. In some embodiments, unselected datasets may be hidden. Whether deemphasized or hidden, the other datasets may remain indicated within the legend of the graph presented at step 710.

At step 740, an input may be received from a user of a point on the graph. This point may be selected by the user touching a point of the graph using a touch screen of the device performing method 700. An example of this is illustrated in FIG. 3. The position of the point selected by the user may be approximately along the x-axis where the user desires to view values of one or more data points of the dataset selected at step 720. The user inputting a point anywhere on the graph that has the x-axis coordinate of the point selected by the user may result in selection of the same data point of the selected dataset. Other forms of input are also possible, such as a user using a cursor to select a point on the graph or dragging his or her finger to the desired point. If dragging or a cursor is used, during dragging or cursor movement, a line passing through the point where the user is currently touching the touchscreen may be displayed. While step 740 considers the user selecting a point that corresponds to the desired x-axis coordinate, in other embodiments the point may correspond to a desired y-axis coordinate or some other axis.

At step 750, a data point may be selected using the dataset selected at step 720 and the position of the point received at step 740. As such, the data point selected is part of the previously selected dataset. A line parallel to the y-axis that passes through the position of the point received at step 740 may be used to identify the data point of the dataset. The location along the x-axis for the point received at step 740 and the data point may be the same or similar. (That is, the data point may be: an actual data point of the dataset, the closest available data point to the x-axis coordinate of the point received at step 540, or one or more values of the data point may be interpolated or extrapolated.) Examples are illustrated in FIGS. 4 and 5.

At step 760, one or more values of the data point selected at step 750 may be presented, such as via a tooltip (such as in FIG. 4 and FIG. 5). The values may include an x-axis value, a y-axis value, and/or some other value of the data point. An indication of the selected dataset may also be presented to the user. Besides using a tooltip, some other form of presenting the data point to the user may be used, such as displayed outside the display area of the graph.

Figure 8:
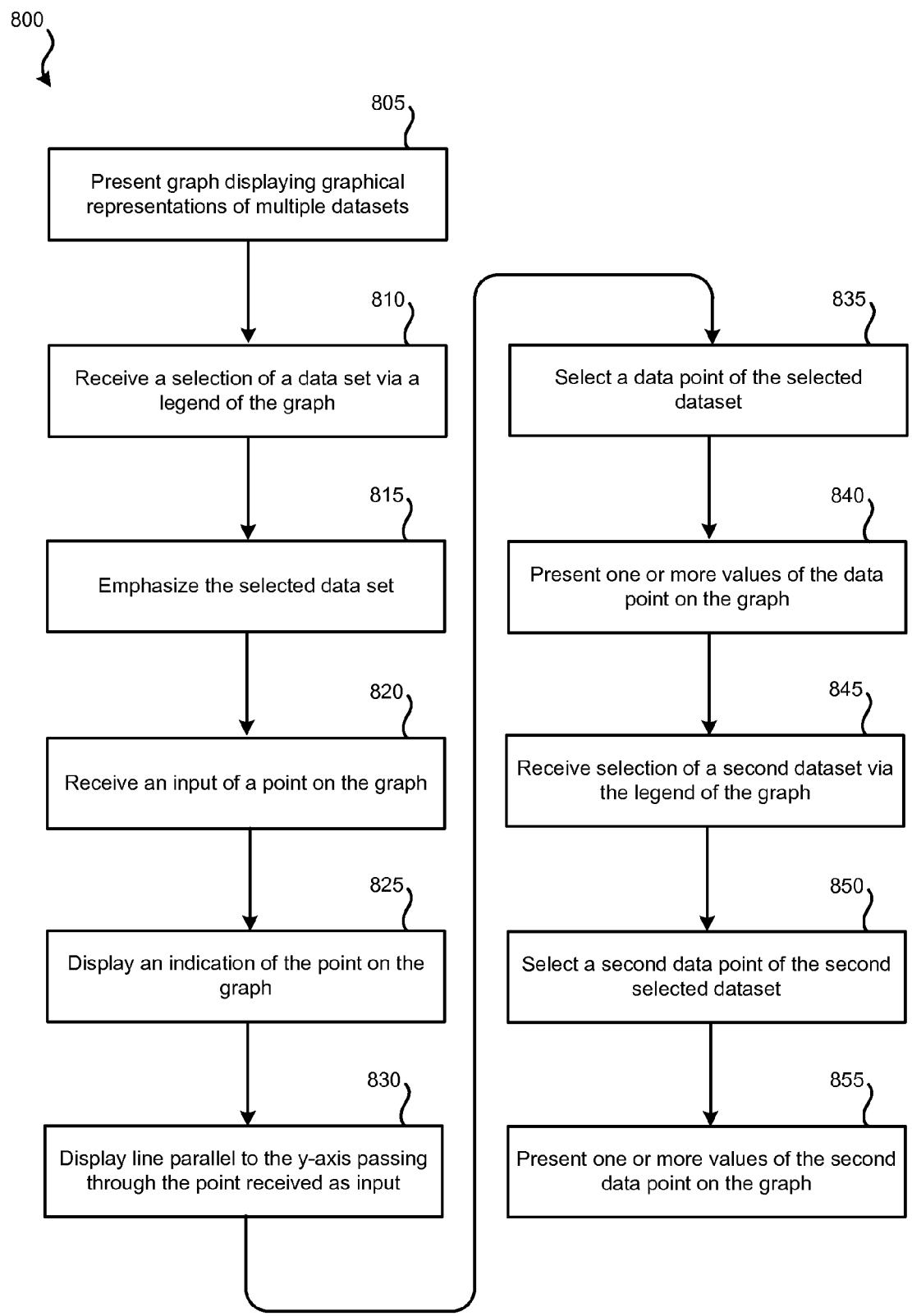
FIG. 8 illustrates another embodiment of a method for selecting and identifying a data point of a dataset presented on a graph.

FIG. 8 illustrates an embodiment of a method 800 for selecting and identifying a data point of a dataset presented on a graph. Method 800 may be performed using a system, such as system 600 of FIG. 6. One or more other computerized devices may also be used to perform method 800. A mobile device, such as a cellular phone, which may have a touch screen interface, may also be used to perform method 800. Method 800 may involve a mobile device communicating with a remote server via one or more networks, such as the Internet. Means for performing each step of method 800 include a mobile computerized device (e.g., a cellular phone, tablet computer), a computer system, and/or some other type of computerized device. Method 800 may represent a more detailed embodiment of method 700 of FIG. 7.

At step 805, a graph may be presented that displays graphical representations of multiple datasets, each of which contains multiple data points. Each dataset may be represented by a line or some other form of graphical representation, such as bars. The graph may be presented using a touch screen device, such that a user can touch various points on the graph. A legend for the graph be present that indicates each dataset presented on the graph. The user may also be permitted to provide touch input in respect to the legend of the graph.

To present the graph, information may be locally retrieved by the device performing step 805. In some embodiments, data, such as datasets, may be retrieved from a remote computer system via a network. Referring to FIG. 6, mobile device 610 may retrieve data from application server (which accesses database 640) via network 620 (which may include a cellular network). In some embodiments, application server 630 may perform some or all of the processing necessary to create the graph presented at step 805. In such embodiments, an image of the graph may be transmitted to mobile device 610 via network 620.

At step 810, a selection of a dataset may be received. This may occur via a touch interface by a user selecting a dataset via the legend of the graph. An example of this is illustrated in embodiment 200 of FIG. 2. In other embodiments, selection of the dataset may occur via some other form of user input, such as a keystroke or gesture.

At step 815, the selected dataset may be emphasized. Emphasizing the selected dataset may include bolding or otherwise highlighting the graphical representation of the dataset (e.g., the line fit to the data points of the dataset) presented on the graph. Emphasizing the selected dataset may alternatively or additionally include emphasizing the indication of the dataset appearing in the legend of the graph, such as by outlining it (as illustrated in FIG. 2) or deemphasizing other entries within the legend.

Emphasizing the selected dataset may include deemphasizing graphical representations of other datasets, such as by fading them. In some embodiments, unselected datasets may be hidden. Whether deemphasized or hidden, the other datasets may remain indicated within the legend of the graph presented at step 805.

At step 820, an input may be received from a user of a point on the graph. This point may be selected by the user touching a point of the graph using a touch screen of the device performing method 800. An example of this is illustrated in FIG. 3. The position of the point selected by the user may be approximately along the x-axis where the user desires to view values of one or more data points of the dataset selected at step 810. Other forms of input are also possible, such as a user using a cursor to select a point on the graph or dragging his or her finger to the desired point. If dragging or a cursor is used, during dragging or cursor movement, a line passing through the point where the user is currently touching the touchscreen may be displayed. While step 820 considers the user selecting a point that corresponds to the desired x-axis coordinate, in other embodiments the point may correspond to a desired y-axis coordinate or some other axis.

At step 825, an indication of the position of the point on the graph received at step 820 may be displayed. For example, an "x" to mark the location of the position input by the user may be used. Other graphical indicators to mark the position may also be used.

At step 830, a line parallel to the y-axis that passes through the position of the point on graph received at step 820 may be displayed. This line may extend through the one or more graphical representations of datasets presented via the displayed graph. While in method 800 the line is parallel to the y-axis, it should be understood that which axis the line is parallel to may be selected by the user and/or determined based on one or more characteristics of the graph.

At step 835, a data point may be selected using the dataset selected at step 810 and the position of the point received at step 820. As such, the data point selected is part of the previously selected dataset. The line parallel to the y-axis that passes through the position of the point received at step 820 may be used to identify the data point of the dataset. Put another way, the x-axis coordinate of the position of the point received at step 820 may be used to select a data point from the dataset selected at step 810. The data point selected may be: an actual data point of the dataset (e.g., a data point that corresponds to the same x-axis coordinate of the position of the point received at step 820), the closest available data point to the x-axis coordinate of the point received at step 820, or one or more values of the data point may be interpolated or extrapolated. Examples are illustrated in FIGS. 4 and 5.

At step 840, one or more values of the data point selected at step 835 may be presented, such as via a tooltip (such as in FIG. 4 and FIG. 5). The values may include an x-axis value, a y-axis value, and/or some other value of the data point. An indication of the selected dataset may also be presented to the user. Besides using a tooltip, some other form of presenting the data point to the user may be used, such as displayed outside the display area of the graph. While one or more values of the data point selected at step 835 is presented, values of other data points (of the same dataset and/or other datasets) may not be displayed.

If a user desires to select another data point within the same dataset, such as a data point immediately to the left or right, a gesture, such as a swipe (to the left or to the right), may be performed. If such a gesture is performed one or more values of such data point may be presented to the user. Additionally or alternatively, if the user desires to select a different point, the user may touch another position on the graph. Method 800 may then repeat for the new input point on the graph.

The user may also select a different dataset (such as by using the legend). At step 845, the user may select a different dataset via the legend of the graph. This may occur via the touch interface by the user selecting a second dataset via the legend of the graph. In other embodiments, selection of the dataset may occur via some other form of user input, such as a keystroke or gesture.

At step 850, a second data point of the second dataset may be selected. The position of the point on the graph at step 825 may be used in conjunction with the selected dataset to select the second data point. As such, the data point selected is part of the newly selected dataset (of step 845). The line parallel to the y-axis that passes through the position of the point received at step 820 may be used to identify the data point of the dataset. Put another way, the x-axis coordinate of the position of the point received at step 820 may be used to select a data point from the second dataset selected at step 845. The data point selected may be: an actual data point of the dataset (e.g., a data point that corresponds to the same x-axis coordinate of the position of the point received at step 820), the closest available data point to the x-axis coordinate of the point received at step 820, or one or more values of the data point may be interpolated or extrapolated.

At step 855, one or more values of the data point selected at step 850 may be presented, such as via a tooltip. The values may include an x-axis value, a y-axis value, and/or some other value of the data point. An indication of the selected dataset may also be presented to the user. Besides using a tooltip, some other form of presenting the data point to the user may be used, such as displayed outside the display area of the graph. While one or more values of the data point selected at step 850 is presented, values of other data points (of the same dataset and/or other datasets) may not be displayed.

While the above method focuses on a line that is parallel to the y-axis being used, it should be understood that a line parallel to the x-axis (or some other axis) may be used to other embodiments.

Figure 9:
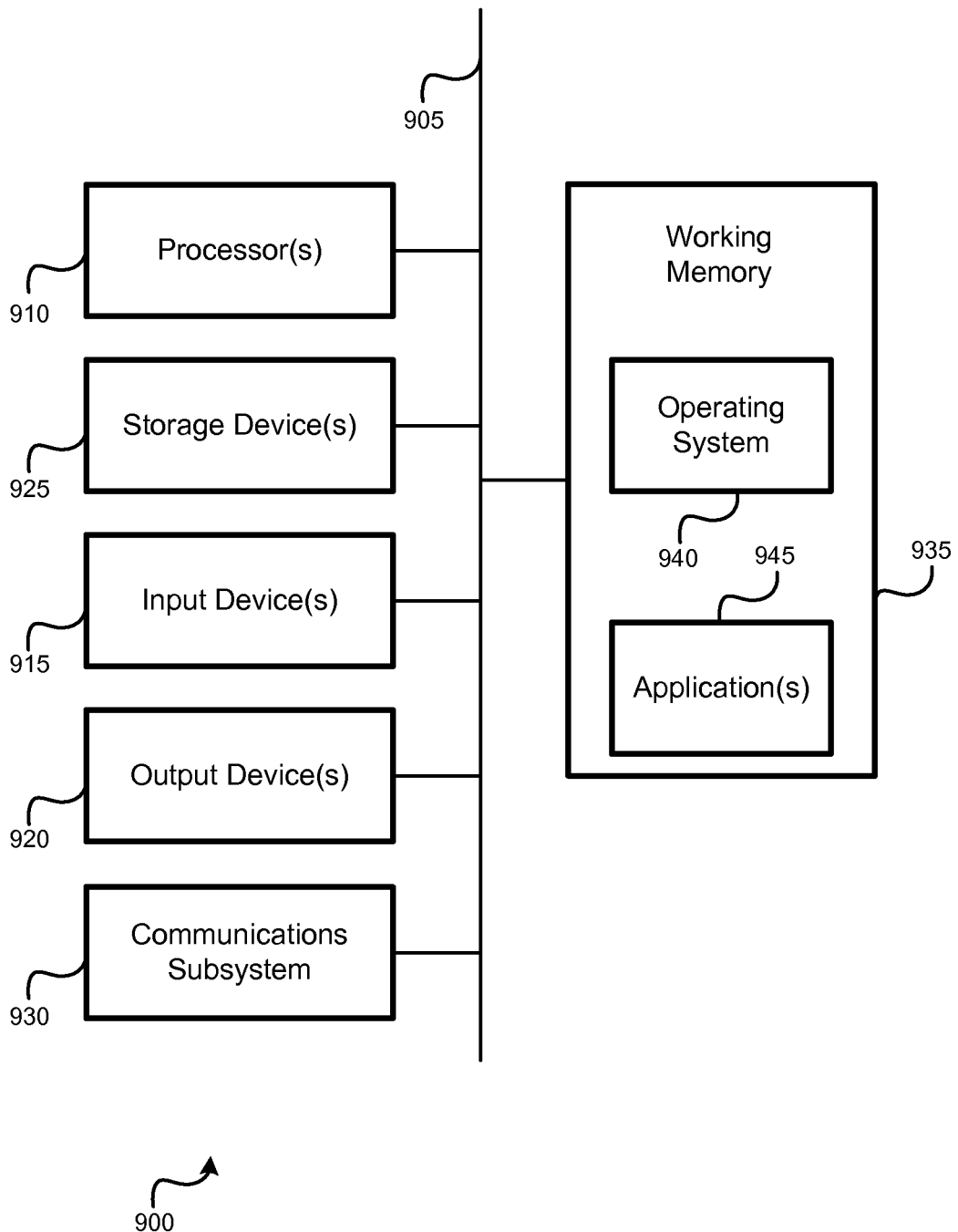
FIG. 9 illustrates an embodiment of a computer system.

A computer system as illustrated in FIG. 9 may be incorporated as part of the previously described computerized devices, such as a mobile device or computer system presenting the graphs of FIGS. 1-4. The computer system of FIG. 9 may represent at least some of the components of various types of computerized devices, such as mobile devices (e.g., cellular phones). Computer system 900 may represent some or all of the components of mobile device 610 and/or application server 630 of system 600. FIG. 9 provides a schematic illustration of one embodiment of a computer system 900 that can perform the methods provided by various embodiments, as described herein. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, and/or the like); one or more input devices 915, which can include without limitation a mouse, a keyboard, and/or the like; and one or more output devices 920, which can include without limitation a display device, a printer, and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the non-transitory storage device(s) 925. Merely by way of example, execution of the sequences of instructions contained in the working memory 935 might cause the processor(s) 910 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 (and/or components thereof) generally will receive signals, and the bus 905 then might carry the signals (and/or the data, instructions, etc. carried by the signals) to the working memory 935, from which the processor(s) 910 retrieves and executes the instructions. The instructions received by the working memory 935 may optionally be stored on a non-transitory storage device 925 either before or after execution by the processor(s) 910.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for identifying a data value of a dataset presented on a graph, comprising:
    presenting, by a touchscreen computerized device, the graph, wherein the graph illustrates a plurality of datasets and a legend that identifies each of the plurality of datasets;
    receiving, by the touchscreen computerized device, a selection of the dataset via the legend of the graph by a user touching a location on a touchscreen of the touchscreen computerized device corresponding to the dataset on the legend of the graph, wherein the dataset is part of the plurality of datasets;
    emphasizing, by the touchscreen computerized device, in the legend, only the dataset indicated by the selection made via the legend of the graph, wherein:
        each other dataset of the plurality of datasets remain listed in the legend and presented on the graph and presentation of each other dataset of the plurality of datasets on the graph is unaffected by the received selection;
    after receiving the selection of the dataset, receiving, by the touchscreen computerized device, an input of a point on the graph by the user touching the point on the touchscreen, the point on the graph being offset from the graphical representation of the dataset indicated by the selection;
    selecting, by the touchscreen computerized device, a single data point of the dataset based on an x-axis coordinate of the point on the graph; and
    presenting, by the touchscreen computerized device, a value of only the single selected data point corresponding to the dataset indicated by the selection of the dataset made via the legend of the graph, such that values of no other data points are presented.

2. The method for identifying the data value of the dataset presented on the graph of claim 1, wherein the data point has a closest x-axis value of the dataset to the x-axis coordinate of the point on the graph.

3. The method for identifying the data value of the dataset presented on the graph of claim 1, wherein the value of the single data point is interpolated based on the dataset and the x-axis coordinate of the point on the graph.

4. The method for identifying the data value of the dataset presented on the graph of claim 1, wherein a line is displayed on the graph that passes through the point on the graph and is parallel to a y-axis of the graph.

5. The method for identifying the data value of the dataset presented on the graph of claim 4, wherein an indication of the point on the graph is presented.

6. The method for identifying the data value of the dataset presented on the graph of claim 1, wherein:
    the graph is presented using a mobile device that functions as the touchscreen computerized device, and
    the selection of the dataset is received via the touch screen interface of the mobile device,
    the input of the point of the graph is received via the touch screen interface of the mobile device; and, wherein the method further comprises:
    presenting, by the touchscreen computerized device, a graphical representation of the point of the graph, indicative of where the user touched the touch screen interface.

7. The method for identifying the data value of the dataset presented on the graph of claim 6, further comprising:
    receiving, by the touchscreen computerized device, a swipe gesture on the touch screen interface of the mobile device; and
    presenting, by the touchscreen computerized device, based at least in part on the swipe gesture, only a second value of a second data point of the dataset instead of the value of the single data point.

8. The method for identifying the data value of the dataset presented on the graph of claim 1, wherein the value of the data point is presented as a tooltip.

9. The method for identifying the data value of the dataset presented on the graph of claim 1, further comprising:
    after presenting the value of the data point, receiving, by the touchscreen computerized device, a second selection of a second dataset via the legend of the graph, wherein the second dataset is part of the plurality of datasets; and
    in response to the second selection, presenting, by the touchscreen computerized device, only a second value of a second data point from the second dataset that corresponds to the point on the graph instead of the value of the single data point.

10. A non-transitory processor-readable medium comprising a computer program product for identifying a data value of a dataset presented on a graph, the computer program product comprising processor-readable instructions configured to cause a processor to:
    cause the graph to be presented via a touchscreen wherein the graph illustrates a plurality of datasets and a legend that identifies each of the plurality of datasets;
    receive a selection of the dataset via the legend of the graph by a user touching a location on the touchscreen corresponding to the dataset within the legend of the graph, wherein the dataset is part of the plurality of datasets;
    emphasize a graphical representation of only the dataset within the legend indicated by the selection made via the legend of the graph, wherein:
        each other dataset of the plurality of datasets remain listed in the legend and presented on the graph; and
        each other dataset of the plurality of datasets is unaffected by the received selection;
    after receiving the selection of the dataset, receive an input of a point on the graph by the user touching the point on the touchscreen, the point on the graph being offset from the graphical representation of the dataset indicated by the selection;
    select a single data point of the dataset based on an x-axis coordinate of the point on the graph; and
    cause a value of only the single data point to be presented by the touchscreen, the single data point corresponding to the dataset indicated by the selection of the dataset made via the legend of the graph, such that values of no other data points are presented.

11. The computer program product for identifying the data value of the dataset presented on the graph of claim 10, wherein the data point has a closest x-axis value of the dataset to the x-axis coordinate of the point on the graph.

12. The computer program product for identifying the data value of the dataset presented on the graph of claim 10, wherein the value of the single data point is interpolated based on the dataset and the x-axis coordinate of the point on the graph.

13. The computer program product for identifying the data value of the dataset presented on the graph of claim 10, the processor-readable instructions further comprising processor-readable instructions configured to cause the processor to:
    cause a line to be presented on the graph that passes through the point on the graph and is parallel to a y-axis of the graph.

14. The computer program product for identifying the data value of the dataset presented on the graph of claim 10, the processor-readable instructions further comprising processor-readable instructions configured to cause the processor to:
    cause an indication of the point on the graph to be presented, wherein the indication of the point on the graph is indicative of where the user's touch was sensed by the touchscreen.

15. A system for identifying a data value of a dataset presented on a graph, the system comprising:
    a touchscreen;
    a processor; and
    a memory communicatively coupled with and readable by the processor and having stored therein processor-readable instructions which, when executed by the processor, cause the processor to:
        cause the graph to be presented by the touchscreen, wherein the graph illustrates a plurality of datasets and a legend that identifies each of the plurality of datasets;
        receive a selection of the dataset via the legend of the graph by a user touching a location on the touchscreen corresponding to the dataset on the legend of the graph, wherein the dataset is part of the plurality of datasets;
        emphasize a representation of only the dataset in the legend indicated by the selection made via the legend of the graph, wherein:
            each other dataset of the plurality of datasets remain listed in the legend and presented on the graph; and
            presentation of each other dataset of the plurality of datasets on the graph are unaffected by the received selection;
        after receiving the selection of the dataset, receive an input of a point on the graph by the user touching the point on the touchscreen, the point on the graph being offset from the graphical representation of the dataset indicated by the selection;
        select a single data point of the dataset based on an x-axis coordinate of the point on the graph; and
        cause a value of only the single data point to be presented corresponding to the dataset indicated by the selection of the dataset made via the legend of the graph, such that values of no other data points are presented.

* * * * *

UNITED STATES PATENT AND TRADEMARK OFFICE
CERTIFICATE OF CORRECTION

PATENT NO. : 9,098,942 B2
APPLICATION NO. : 13/439636
DATED : August 4, 2015
INVENTOR(S) : Yoshimoto et al.

It is certified that error appears in the above-identified patent and that said Letters Patent is hereby corrected as shown below:

On page 2, column 2, under Other Publications, line 6, delete "defauit." and insert -- default. --, therefor.

Signed and Sealed this
Fifteenth Day of March, 2016

Michelle K. Lee
*Director of the United States Patent and Trademark Office*